US011168795B1

(12) United States Patent
Heffernan

(10) Patent No.: US 11,168,795 B1
(45) Date of Patent: Nov. 9, 2021

(54) ECLIPSE VALVE ASSEMBLY

(71) Applicant: Chad Heffernan, Village of Palmetto Bay, FL (US)

(72) Inventor: Chad Heffernan, Village of Palmetto Bay, FL (US)

(*) Notice: Subject to any disclaimer, the term of this patent is extended or adjusted under 35 U.S.C. 154(b) by 0 days.

(21) Appl. No.: 17/151,471

(22) Filed: Jan. 18, 2021

(51) Int. Cl.
*F16K 3/08* (2006.01)
*F16K 3/18* (2006.01)

(52) U.S. Cl.
CPC .............. *F16K 3/085* (2013.01); *F16K 3/186* (2013.01); *Y10T 137/0514* (2015.04)

(58) Field of Classification Search
CPC . F16K 31/54; F16K 3/18; F16K 3/184; F16K 3/186; F16K 3/0281; F16K 3/029; F16K 99/0011; F02M 19/081; E21B 35/00; Y10T 137/86928; Y10T 137/86944; Y10T 137/86952; Y10T 137/86968; Y10T 137/8696; Y10T 137/86984; Y10T 137/87515; Y10T 137/87491; Y10T 137/87981; Y10T 137/88062; Y10T 137/0514; Y10T 137/6072; Y10T 137/6075; Y10T 137/6082; Y10T 137/6079
USPC ... 137/15.23, 315.23, 315.3, 614.11, 614.21, 137/601.12, 601.15, 628, 630, 630.11, 137/630.15, 630.12; 251/195, 196, 199, 251/203, 212, 237, 248, 250, 326, 327, 251/328; 222/561, 599; 261/62
See application file for complete search history.

(56) References Cited

U.S. PATENT DOCUMENTS

| | | | | |
|---|---|---|---|---|
| 994,587 A * | 6/1911 | Hartzell | .................. | F16K 39/04 137/630.12 |
| 1,165,224 A * | 12/1915 | Cadett | .................. | F02M 19/081 261/62 |
| 1,247,682 A * | 11/1917 | Howell | .................. | G03B 17/14 396/298 |
| 1,788,763 A * | 1/1931 | Gant | ....................... | E21B 35/00 251/1.3 |
| 1,964,663 A * | 6/1934 | Gossler | ..................... | F02D 9/14 251/250 |
| 2,074,701 A * | 3/1937 | Lohmolder | ............. | F16K 31/18 137/614.11 |
| 2,200,416 A * | 5/1940 | Daniels | ................... | F16K 31/54 137/614.11 |
| 2,217,216 A * | 10/1940 | Davis | ...................... | F16K 3/312 251/195 |

(Continued)

FOREIGN PATENT DOCUMENTS

DE 610964 C * 3/1935 ............. F16K 3/029

*Primary Examiner* — Craig J Price
(74) *Attorney, Agent, or Firm* — The Concept Law Group, PA; Scott D. Smiley; Scott M. Garrett

(57) ABSTRACT

An eclipse valve includes at least two reciprocating obturator plates captured in a sealed housing. The obturator plates fill the width of a cavity within the housing and can be moved between aligned and unaligned positions. Each of the obturator plates have an opening through the plate, and when the obturator plates are aligned, the openings through the plates are aligned with each other, and with front and rear openings in the housing, allowing flow through the valve. The plates can be moved to reduce the overlap of the openings through the plates within the housing in an eclipse manner to adjust the rate or amount of flow, and to shut off flow by completely un-aligning the openings.

14 Claims, 13 Drawing Sheets

(56) References Cited

U.S. PATENT DOCUMENTS

| | | | | |
|---|---|---|---|---|
| 2,235,612 A * | 3/1941 | Graney | F16K 3/186 | 251/195 |
| 3,106,173 A * | 10/1963 | Harris | A21C 5/00 | 425/449 |
| 3,357,452 A * | 12/1967 | Middleton | F16L 37/367 | 137/614.01 |
| 3,887,117 A * | 6/1975 | Fehling | B22D 41/42 | 222/600 |
| 4,097,562 A * | 6/1978 | Blakeway | F02M 9/06 | 261/41.4 |
| 4,260,081 A * | 4/1981 | Detalle | B22D 41/24 | 222/503 |
| 4,351,501 A * | 9/1982 | Peash | B64D 13/04 | 244/129.1 |
| 4,499,919 A * | 2/1985 | Forester | F16K 31/535 | 137/613 |
| 4,531,539 A * | 7/1985 | Jandrasi | F16K 3/029 | 137/375 |
| 5,094,270 A * | 3/1992 | Reimert | F16K 3/029 | 137/614.11 |
| 5,325,888 A * | 7/1994 | Stary | F15B 15/065 | 137/553 |
| 5,332,002 A * | 7/1994 | Reimert | F16K 3/029 | 137/614.11 |
| 5,967,166 A * | 10/1999 | Carter | E21B 34/04 | 137/1 |
| 7,063,107 B2 * | 6/2006 | Loga | F16K 3/0254 | 138/44 |
| 7,213,613 B2 * | 5/2007 | Spakowski | F16K 1/443 | 123/568.2 |
| 7,455,201 B2 * | 11/2008 | Mitsui | B22D 41/24 | 222/600 |
| 7,743,790 B2 * | 6/2010 | Howard | H01J 49/0495 | 137/630.12 |
| 2006/0289820 A1 * | 12/2006 | Chen | F16K 31/54 | 251/129.11 |
| 2007/0017217 A1 * | 1/2007 | Kouzu | F01N 3/206 | 60/289 |

\* cited by examiner

ECLIPSE VALVE ASSEMBLY

FIELD OF THE INVENTION

The present disclosure relates generally to valve systems and, more particularly, relates to a valve having opposing, and oppositely moving obturator plates contained within a valve housing that, when moved relative to each other within the valve housing, open or close a pathway through the plates by aligning or de-aligning corresponding openings or apertures through each plate.

BACKGROUND OF THE INVENTION

Conventional valve designs have inherent flaws that do not lend to performing well in both flow regulation and flow stoppage. Conventional valve designs are intended to perform well at one task or the other, and rarely both. Therefore, when designing a flow system, where the system or process requirements call for both good flow regulation and stoppage capability (e.g. no leaks), a stop valve and a regulation valve ("block and bleed") are both required, and are coupled in series. However this configuration leads to extra size, weight, expense, power consumption, and complexity. In addition, the turbulent fluid path that results can cause cavitation and water hammer (system shock), affecting the potential lifespan of the valves, piping and hosing, or the system altogether. Additionally, many valve designs do not allow service or replacement to the obturator elements and other valve components that experience wear over time, requiring the valve assembly to be removed and replaced in its entirety when it begins to function sub-optimally. This increases down time of a system and often requires specially trained technicians to replace the valves. Also, the soft seals are directly in the flow path, leading to greater wear of the sealing surfaces.

One approach to solve the above described problems is a shutter valve such as that shown and taught in U.S. Pat. No. 9,970,554. The shutter valve consists of three or more obturator elements ("petals") that each rotate into a portion of the lumen of the flow path and lock into position with each other for full stop, and each retreat into the valve body for full open. This removes all obstructions to the flow of gases and liquids when the valve is in the open position. However, the shutter valve construction consists of many moving parts, complex construction, and an inability to service while mounted in line. Other valve designs, such as the choke valve separator taught in published U.S. Patent App. No. 2018/0093203, allow in line service and full flow stop, but no ability to open full bore, and therefore requires larger schedule piping to obtain the appropriate amount of flow.

Therefore, a need exists to overcome the problems with the prior art as discussed above.

SUMMARY OF THE INVENTION

In accordance with some of embodiments of the inventive disclosure, there is provided an eclipse valve that includes a housing having a cavity. The cavity is bounded by a floor of the housing, a front wall of the housing that extends upward from the floor at a front of the housing, a back wall opposite the front wall the extends upward from the floor at a back of the housing, a right side wall that extends upward from the floor at a right side of the housing between the front wall and the back wall, and a left side wall that extends upward from the floor at a left side of the housing between the front wall and the back wall. A length of the cavity is defined from the right side wall to the left side wall inside the cavity, and a width of the cavity is defined from the front wall to the back wall inside the cavity. The eclipse valve further includes a front fitting formed at an outside of the front wall that includes a front opening through the front wall. The eclipse valve also includes a back fitting formed at an outside of the back wall that includes a back opening through the back wall. The front and back openings are aligned from front to back along a flow axis. The eclipse valve further includes a first obturator plate disposed in the cavity against the front wall and a second obturator plate disposed in the cavity against the back wall. The first and second obturator plates each have a length that is less than the length of the cavity, and they are in sliding engagement with each other. A width across the first and second obturator plates is substantially equal to the width of the cavity. The first and second obturator plates are configured to reciprocate within the cavity along the length of the cavity in an opposing manner while remaining in contact with the front wall, the back wall, and each other. the first obturator plate has an opening through it in a direction from the front wall to the back wall. The opening through the first obturator plate is off center in a first direction between the right side wall and the left side wall. The second obturator plate has an opening through it in a direction from the front wall to the back wall. The opening through the second obturator plate is off center in a second direction between the right side wall and the left side wall that is opposite the first direction. The first and second obturator plates are moveable in the cavity between an open position and a closed position. In the opening position the opening through the first obturator plate and the opening through the second obturator plate are both aligned with each other and with the front opening and the back opening. In the closed position the first and second obturator plates are moved to opposite sides in the cavity between the right side wall and the left side wall, and the opening through the first obturator plate is completely unaligned from the front opening, and the opening through the second obturator plate is completely unaligned from the back opening.

In accordance with a further feature, the first obturator plate has a vertical wall extension on a top of the first obturator plate. The second obturator plate has a vertical wall extension on a top of the second obturator plate. A driver element is positioned between, and in contact with both the vertical wall extension of the first obturator plate and the vertical wall extension of the second obturator plate. Rotation of the driver element thereby causes the first and second obturator plates to move in opposing direction with respect to each other along the length of the cavity.

In accordance with a further feature, the driver element is a pinion gear attached to a shaft that extend through a cover over the cavity, the pinion gear being circular and having vertically oriented teeth, and the vertical wall extensions of the first and second obturator plates each have vertically oriented teeth along a length of the respective vertical wall section that intermesh with the teeth of the pinion gear.

In accordance with a further feature, the eclipse valve includes a handle attached to the shaft at an opposite end of the shaft from the pinion gear.

In accordance with a further feature, the first obturator plate includes, along its length at an interface between the first obturator plate and the second obturator plate, a horizontal extension that extends into a corresponding horizontal relief of the second obturator plate.

In accordance with a further feature, the eclipse valve can include a cover over the cavity that seals the cavity, and a drive shaft extending through the cover to a horizontally oriented pinion gear under the cover. The pinion gear is disposed between, and in engagement with portions of both the first obturator plate and the second obturator plate to, upon being rotated by the shaft, move the first and second obturator plates in opposing directions within the cavity.

In accordance with some embodiments of the inventive disclosure, there is provided an eclipse valve for flow control that includes a housing having a cavity therein. The housing having a front housing opening at center of a front of the housing and a back housing opening at a center of a back of the housing, a flow axis being defined from the front housing opening to the back housing opening. The eclipse valve can further include a first obturator plate and a second obturator plate disposed in the cavity and operable to each move transversely and independently in the cavity in a direction perpendicular to the flow axis. The first obturator plate being in sliding contact with the front of the housing, the second obturator plate being in sliding contact with the back of the housing, and an opening formed through the first obturator plate and an opening formed through the second obturator plate. The eclipse valve can further include a drive element coupled to the first and second obturator plates that is operable to move the first and second obturator plates in a transverse direction within the cavity, and reciprocally with respect to each other. The first and second obturator plates are movable by the drive element between an open position and a closed position. In the open position the opening through the first obturator plate and the opening through the second obturator plate are both fully aligned with the front housing opening and the back housing opening. In the closed position the first obturator plate is moved such that it does not overlap with the front housing opening and the second obturator plate is moved in the opposite direction from the first obturator plate such that the opening through the second obturator plate does not overlap the back housing opening.

In accordance with a further feature, the eclipse valve further includes a cover disposed over the cavity of the housing which seals the cavity, and a drive shaft that passes through the cover to drive element.

In accordance with a further feature, the first obturator plate has a vertical extension, the second obturator plate has a vertical extension, and the drive element engages the vertical extension of the first obturator plate on a first side of the drive element and the vertical extension of the second obturator plate on a second side of the drive element that is opposite the first side of the drive element.

In accordance with a further feature, the vertical extension of the first obturator plate and the vertical extension of the second obturator plate each have a plurality of vertically oriented teeth, and the drive element is a pinion gear that meshes with the vertically oriented teeth of vertical extension of the first obturator plate and the vertical extension of the second obturator plate.

In accordance with a further feature, the first obturator plate includes, along a length of the first obturator plate, at an interface between the first obturator plate and the second obturator plate, a horizontal extension that extends into a corresponding horizontal relief of the second obturator plate.

In accordance with a further feature, the housing includes a front fitting at the front opening, and a back fitting at the back opening.

In accordance with a further feature, each of the front fitting and back fitting are threaded.

In accordance with a further feature, the opening through the first obturator plate is entirely on one half of the first obturator plate, and the opening through the second obturator plate is entirely on one half of the second obturator plate.

In accordance with a further feature, a diameter of the opening through the first obturator plate and a diameter of the opening through the second obturator plate are substantially equal to a diameter of the front housing opening and a diameter of the back housing opening.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

"In the description of the embodiments of the present invention, unless otherwise specified, azimuth or positional relationships indicated by terms such as "up", "down", "left", "right", "inside", "outside", "front", "back", "head", "tail" and so on, are azimuth or positional relationships based on the drawings, which are only to facilitate description of the embodiments of the present invention and simplify the description, but not to indicate or imply that the devices or components must have a specific azimuth, or be constructed or operated in the specific azimuth, which thus cannot be understood as a limitation to the embodiments of the present invention. Furthermore, terms such as "first", "second", "third" and so on are only used for descriptive purposes, and cannot be construed as indicating or implying relative importance.

In the description of the embodiments of the present invention, it should be noted that, unless otherwise clearly defined and limited, terms such as "installed", "coupled", "connected" should be broadly interpreted, for example, it may be fixedly connected, or may be detachably connected, or integrally connected; it may be mechanically connected, or may be electrically connected; it may be directly connected, or may be indirectly connected via an intermediate medium. As used herein, the terms "about" or "approximately" apply to all numeric values, whether or not explicitly indicated. These terms generally refer to a range of numbers that one of skill in the art would consider equivalent to the recited values (i.e., having the same function or result). Those skilled in the art can understand the specific meanings of the above-mentioned terms in the embodiments of the present invention according to the specific circumstances.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

Figure 1:
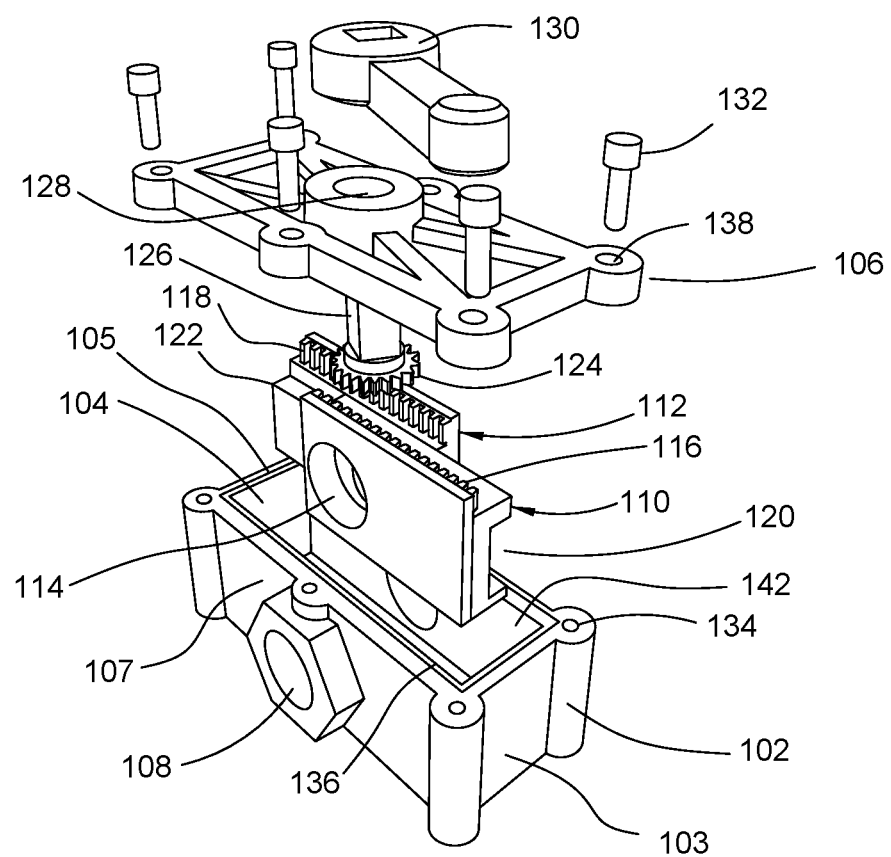
FIG. 1 is a front exploded perspective view of an eclipse valve, in accordance with some embodiments.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The present invention provides a novel and efficient valve for industrial and other applications. The valve uses two obturator plates that each have a respective opening through them, and which are moved in opposite direction with the valve housing such that each plate eclipses the opening of the other to close the valve, and when the plates are moved to align the openings the valve is open. The inventive valve uses just three moving parts, which is substantially simpler that some prior art designs, such as shutter valves. In the following drawings reference numerals are carried forward to refer to the same features among the drawings. However, because of the various views, not every reference numeral is used in every drawing.

Figure 2:
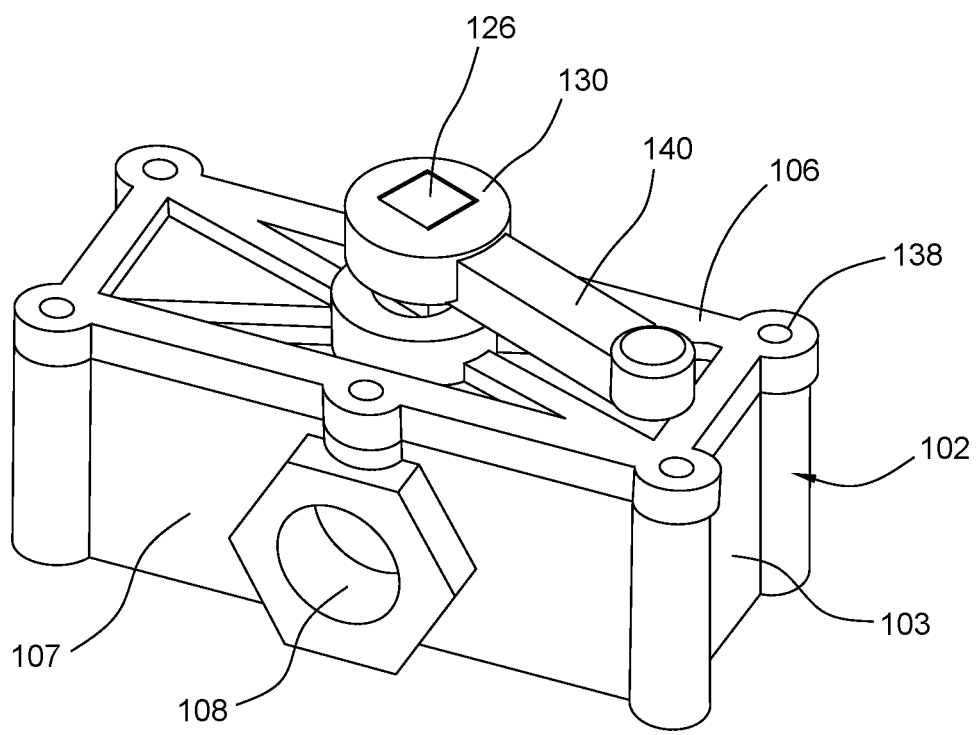
FIG. 2 is a front perspective view of an assembled eclipse valve, in accordance with some embodiments.
Figure 3:
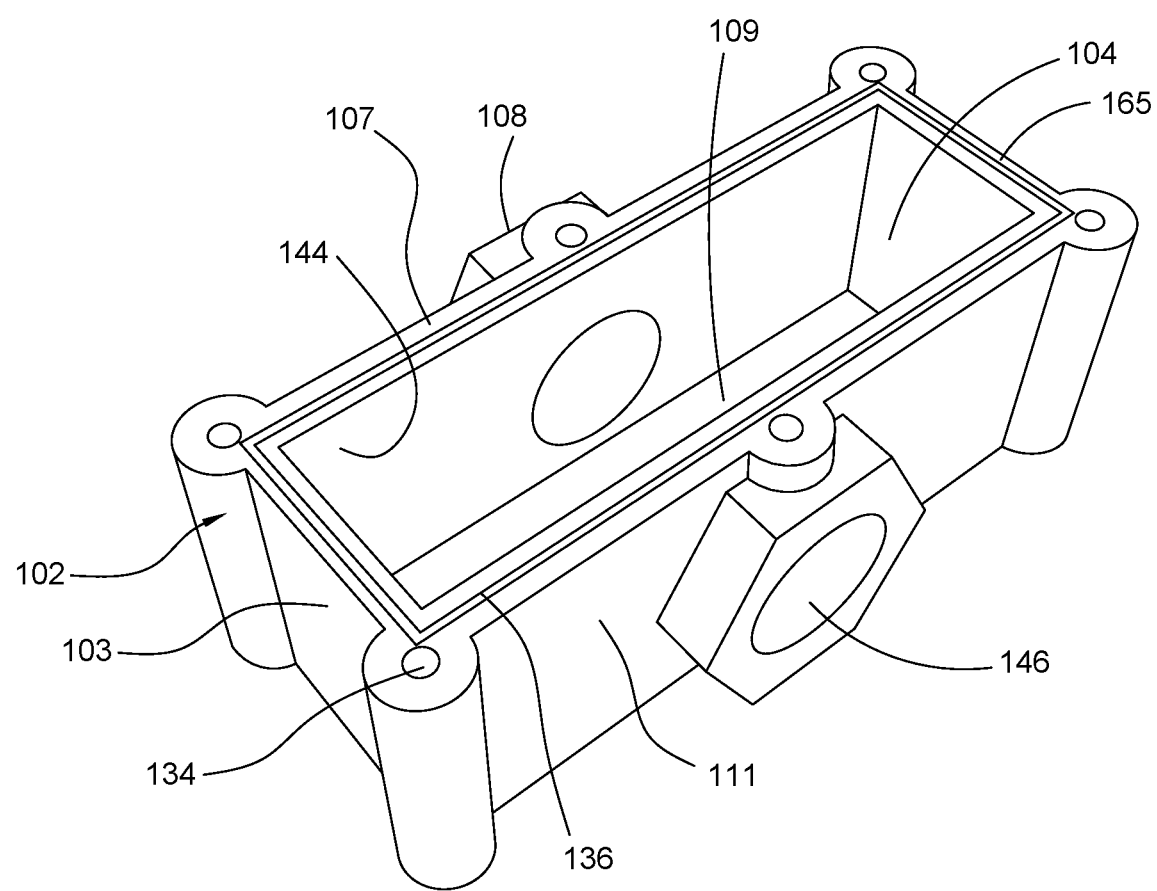
FIG. 3 is a top perspective view of a housing for an eclipse valve, in accordance with some embodiments.

FIG. 1 is a front exploded perspective view of an eclipse valve 100, in accordance with some embodiments. In the following description reference should be made to all of the drawings in FIGS. 1-12 as certain features, due to the various view angles, may be seen in some of the drawings and not in others. FIG. 2 shows the assembled valve 100 having a manual drive configuration. FIG. 3 shows the valve housing 102 by itself.

The valve 100 includes a valve housing 102, or simply, a housing 102. The housing 102 defines a cavity 104 in the interior of the housing 102. The cavity 104 is bounded by a floor 109 (e.g. FIG. 3), a front wall 107, and back wall 111, a right side wall 103 and a left side wall 105, and the cover 106. The length of the cavity 104 is defined as the distance from the right side wall 103 to the left side wall 105, and the width of the cavity 104 is defined as the distance from the front wall 107 to the back wall 111, inside the cavity 104. Inside the cavity 104 there is a first obturator plate 110 and a second obturator plate 112. The obturator plates 110, 112 fit into the cavity such that, along the width of the cavity, the first obturator plate 110 slidably bears against the inside surface 144 of the front wall 107, and the second obturator plate 112 slidably bears against the inside surface 142 of the back wall 111, while the obturator plates 110, 112 also slidably bear against each other at their interface. The phrase "slidably bears against" means that the obturator plates are in contact with the wall and each other, but can slide across the walls and each other. The mating interfaces form a seal despite being able to move, as is well known in valve design. Additionally, the surfaces of the walls 107, 111 and the exterior surface of the obturator plate are similarly shaped to maximize contact. In some embodiments the interior walls (e.g. 142, 144) of the cavity and the exterior side faces of the obturator plates 110, 112 can be flat. In some embodiments the cavity 104 can be rectanguloid in shape. Furthermore, the obturator plates 110, 112 are in sliding contact with each other in the central region of the cavity 104, forming a similar surface to surface engagement that allows the two plates 110, 112 to slide back and forth past each other. The contact between the plates 110, 112, and the walls 107, 111 and each other is such that they form a seal as occurs, for example, in brass ball valves. Accordingly, the obturator plates 110, 112 can be made of a relatively soft metal such as brass, or similar materials that allow for watertight seals at the interfaces of the plates to the walls of the housing, as well as to each other.

The front wall 107 of the housing 102 includes a fitting for coupling the valve 100 to a piping element. Likewise, the back wall 111 also has a fitting that is inline, through the valve 100 with the fitting at the front wall 107. The fittings can be threaded to facilitate threaded engagement with piping elements. Accordingly, the front fitting surrounds affront housing opening 108 through the front wall 107, and the back fitting surround a corresponding back housing opening 146 through the back wall 111. The front housing opening 108 and the back housing opening 146 are aligned on a flow axis 160 (see FIG. 4) to allow flow through the valve 100 when the valve 100 is open.

Figure 5:
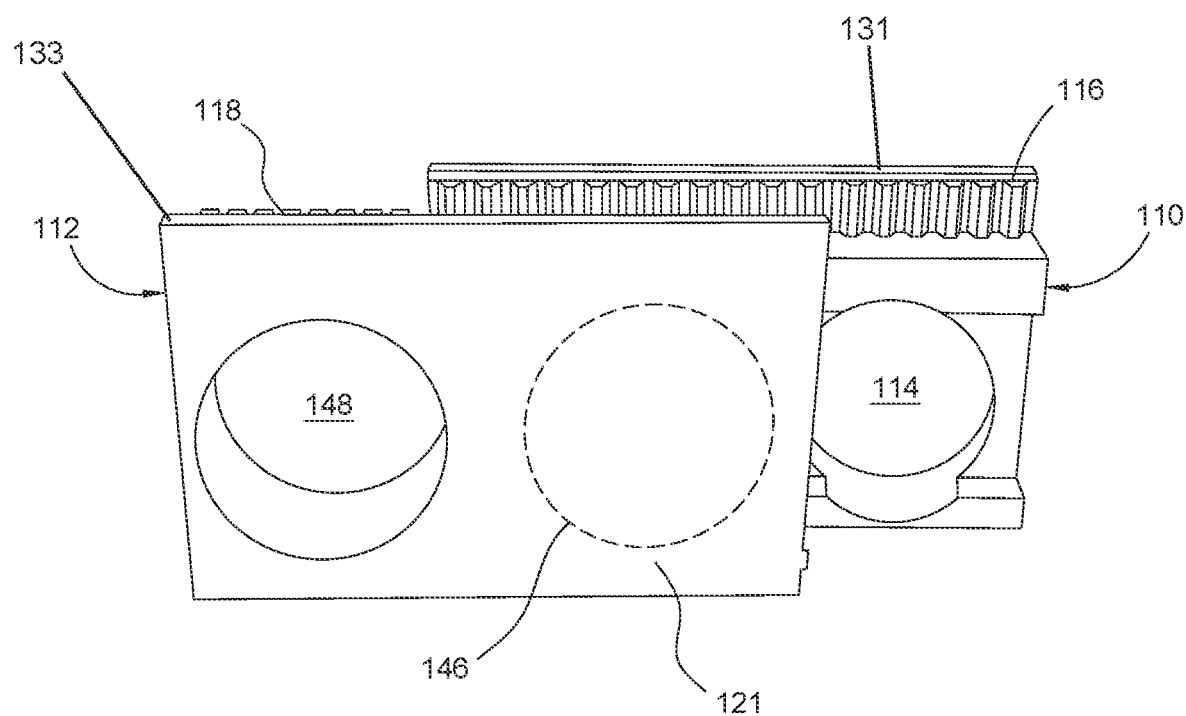
FIG. 5 is a front perspective view of the obturator plates of an eclipse valve in the closed position, as they would be in the housing, in accordance with some embodiments.

Similarly, each of the obturator plates 110, 112 have a respective plate openings 114, 148 (see FIG. 5). However, as seen, for example, in FIGS. 5, 7, 9, and 11, the plate openings 114, 148 through the obturator plates 110, 112 are off center on the obturator plates 110, 112. In fact, the openings 114, 148 are mostly, if not exclusively, on one half of each plate 110, 112, and do not extend across the center of the respective plate 110, 112. The openings 114, 148 can be sized to be about the same diameter/size as the openings 108, 146 through the front and back walls 107, 111. Thus, as the plates 110, 112 move within the cavity 104 in opposite directions, they can be positioned in the cavity such that their respective plate openings 114, 148 are aligned with the housing openings 108, 146 to fully open the valve 100 for flow through the valve 100. To close the valve 100, the plates 110, 112 are then moved transversely in the cavity 104 in opposing directions such that the opening 114 through the first obturator plate 110 moves in an opposite direction of the opening 148 through the second obturator plate 112, and both plates 110, 112 are moved until their respective openings 114, 148 are completely out of alignment from the wall openings 114, 146 and each other. Accordingly, when the plate openings 114, 148 are the same size as the wall openings 114, 146, the length of the cavity 114 must be at least three times the diameter of the openings 108, 114, 146, 148 to ensure that the plate openings 114, 148 can be moved completely out of alignment, and not overlap at all, with the wall openings 108, 146.

In addition to the housing 102 and obturator plates 110, 112, the valve includes a cover 106 that forms an upper boundary of the cavity 104 and seals the cavity 104. A gasket 136 can be provided around the top perimeter of the housing 102, along the tops of the front wall 107, side wall 103, back wall 111, and side wall 105. The cover 106 can be coupled to the housing using, for example, bolts 132 that pass through openings 138 and engage threaded bolt receiver bores 134. The cover 106 also has an opening 128 through the cover 106 to accommodate a drive shaft 126. The drive shaft 126 extends through the cover or shaft opening 128 and can be connected to a handle 130 for manual operation, or equivalently, a servo or motor for mechanical operation. The shaft 126 is further coupled to a drive element 124 that imparts opposing forces to each of the obturator plates 110, 112 to cause them to move within the cavity 104 in an opposing and reciprocal manner. The drive element 124 can be a gear (e.g. a pinion gear) that engages vertically oriented teeth 116, 118 on the vertical extensions of the obturator plates 110, 112 in a "rack and pinion" type arrangement. Accordingly, as the shaft 126 is rotated in one direction, the plates 110, 112 are moved to bring their plate openings 114, 148 into alignment with the wall openings 108, 146 to open the valve 100, and by turning the shaft 126 in the opposite direction, the plates 110, 112 are moved in the opposite direction such that the plate openings 114, 148 are moved in opposite directions, away from the wall openings 108, 146 and each other.

FIGS. 4-11 show a series of positions of the obturator plates 110, 112 in the housing 102, moving from full closed to fully open. FIGS. 4, 6, 8, and 10 show overhead views of the housing 102 and plates 110, 112 in the housing, and FIGS. 5, 7, 9, and 11 show side perspective views of the plates 110, 112 alone, in the position relative to each other as they appear in FIGS. 4, 6, 8, and 10, respectively.

Figure 4:
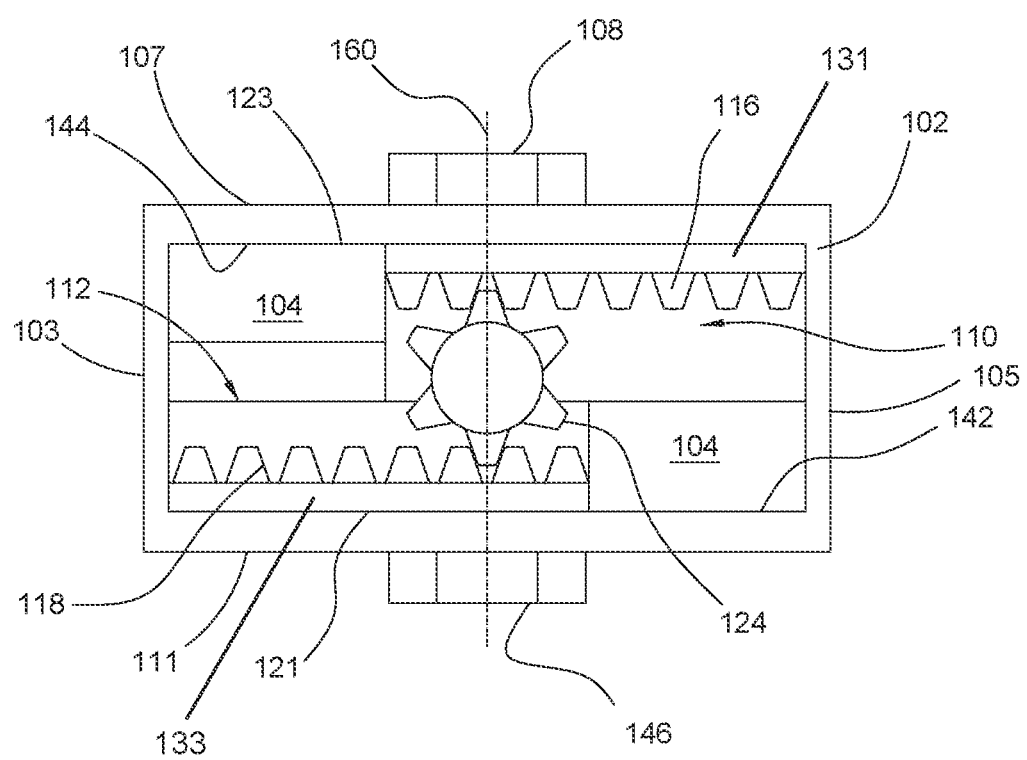
FIG. 4 is a top plan view of an eclipse valve with the cover removed showing the obturator plates in a closed position, in accordance with some embodiments.
Figure 6:
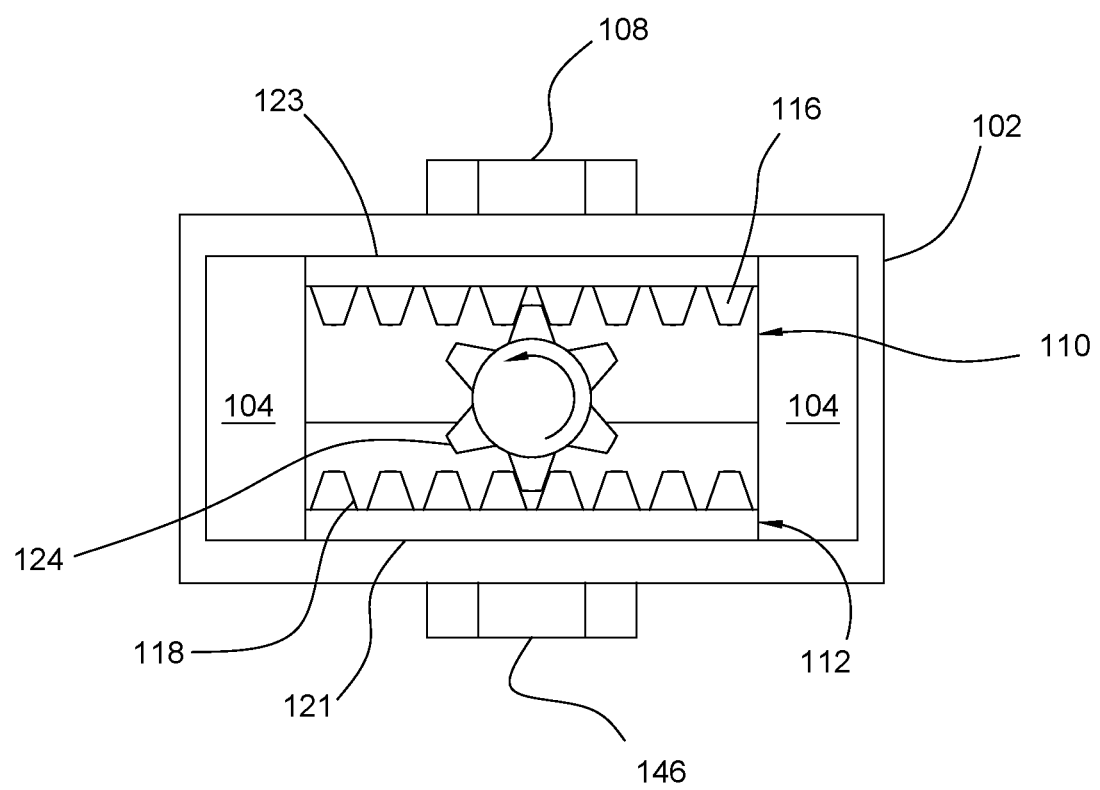
FIG. 6 is a top plan view of an eclipse valve with the cover removed showing the obturator plates in an intermediate position, in accordance with some embodiments.
Figure 7:
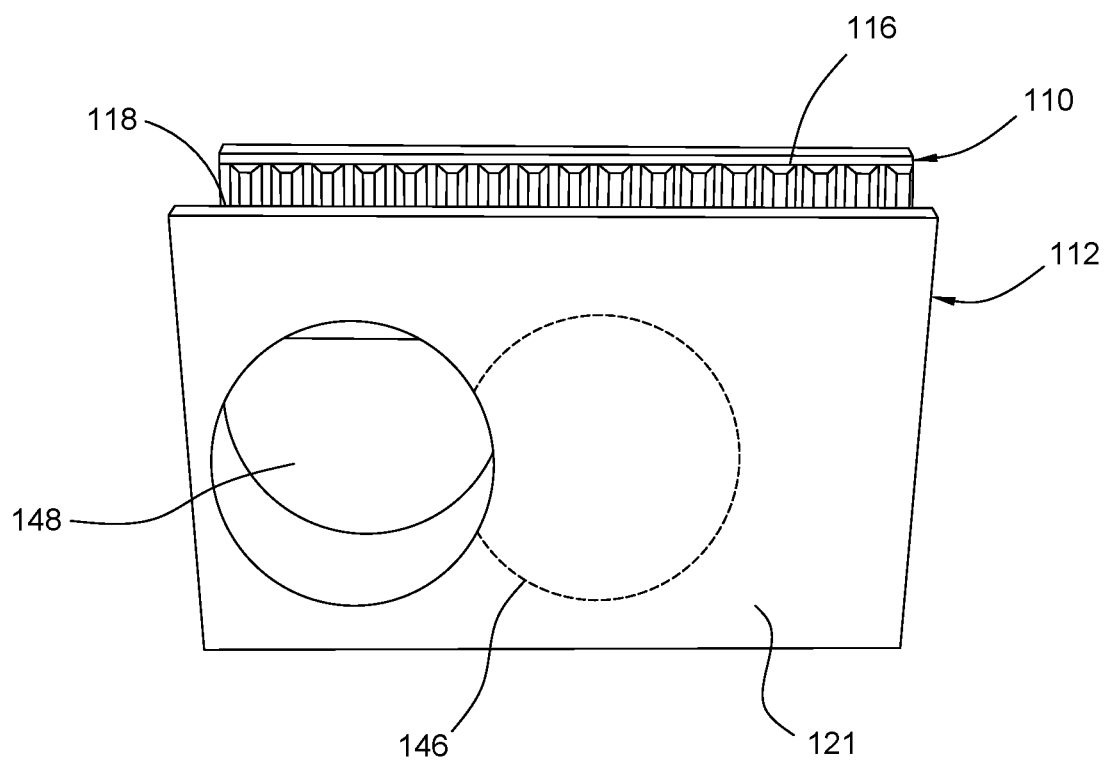
FIG. 7 is a front perspective view of the obturator plates of an eclipse valve in the intermediate position, as they would be in the housing, in accordance with some embodiments.
Figure 8:
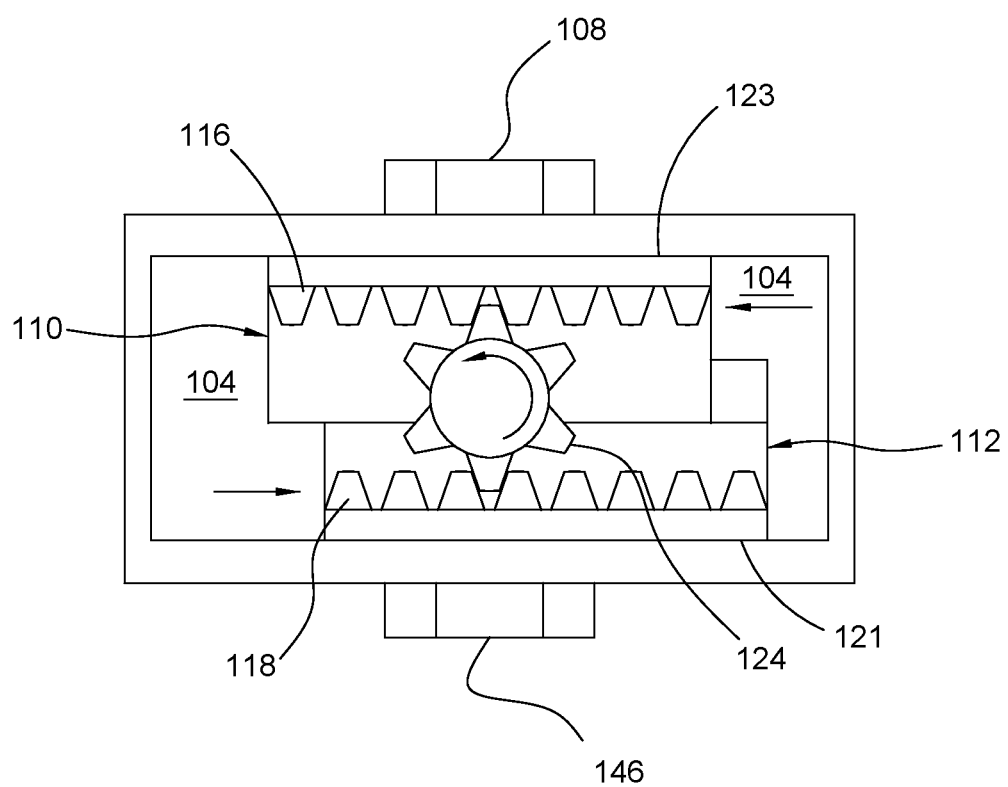
FIG. 8 is a top plan view of an eclipse valve with the cover removed showing the obturator plates in a partially open position, in accordance with some embodiments.
Figure 9:
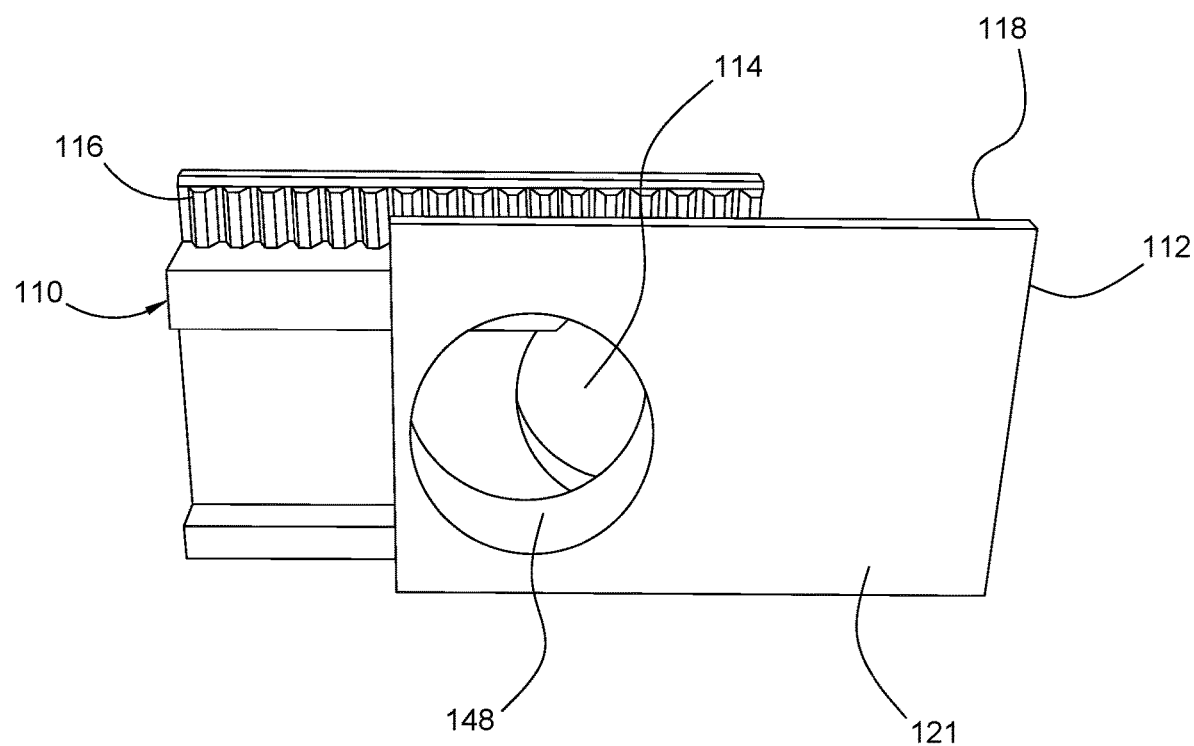
FIG. 9 is a front perspective view of the obturator plates of an eclipse valve in the partially open position, as they would be in the housing, in accordance with some embodiments.
Figure 10:
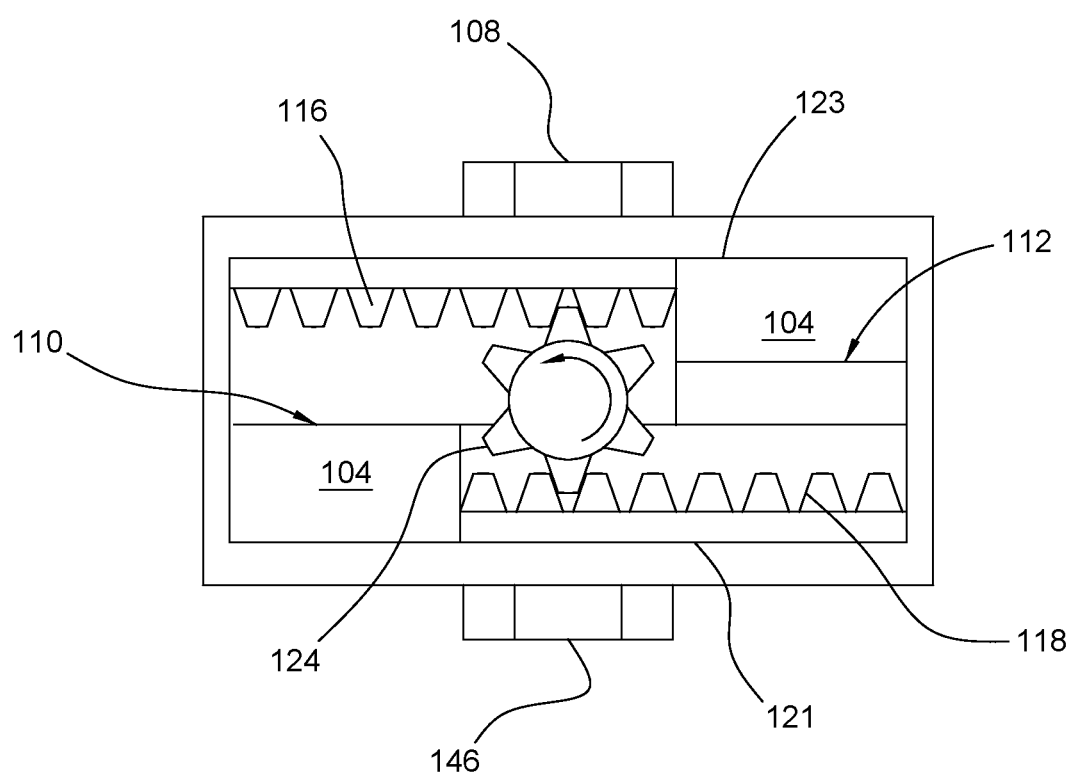
FIG. 10 is a top plan view of an eclipse valve with the cover removed showing the obturator plates in a fully open position, in accordance with some embodiments.
Figure 11:
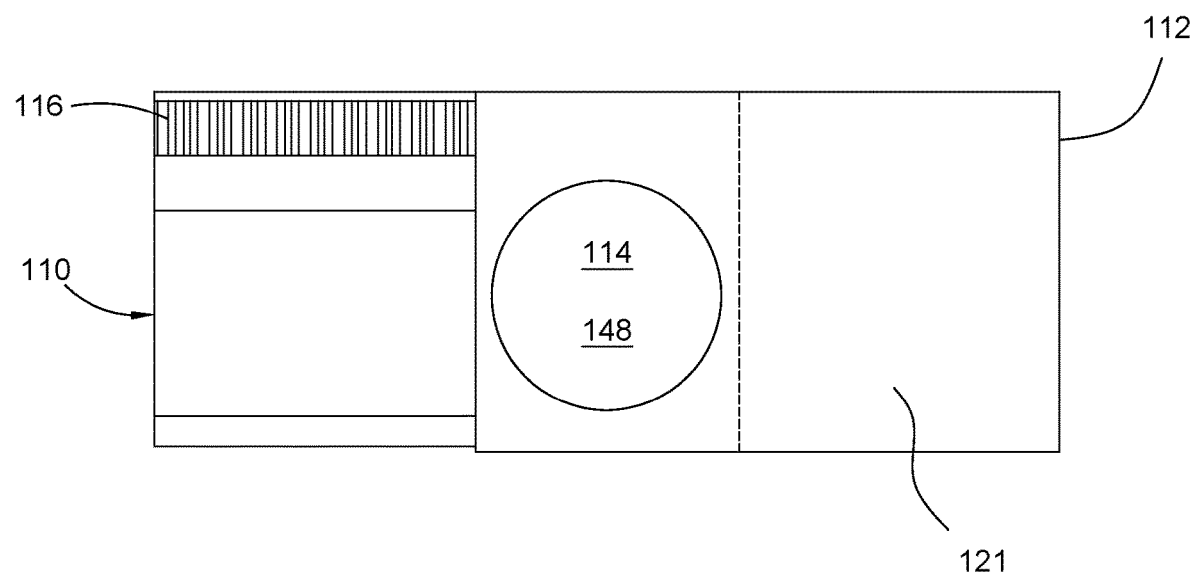
FIG. 11 is a front perspective view of the obturator plates of an eclipse valve in the fully open position, as they would be in the housing, in accordance with some embodiments.

FIG. 4 is a top plan view of an eclipse valve housing 102 with the cover removed showing the obturator plates 110, 112 in a closed position, in accordance with some embodiments. Similarly, FIG. 5 is a front perspective view of the obturator plates 110, 112 in the position shown in FIG. 4, but shown outside of the housing 102. The plates 110, 112 sit within the cavity 104 of the housing 102 in FIG. 4, as well as in FIGS. 6, 8, and 10. A drive element 124 such as a pinion gear has teeth that mesh with teeth 116, 118 on the vertical extensions of the plates 110, 112 to drive the plates 110, 112 in a reciprocal manner in the cavity 104. Obturator plate 110 bears against the inside surface 144 of the front wall 107 at interface 123, and obturator plate 112 bears against the inside surface 142 of the back wall 111 at interface 121. Further, the plates 110, 112 bear against each other as well. In FIG. 4 the plates 110, 112 are moved apart, substantially as far as they can in the cavity 104, against side walls 103, 105. In this position, as shown in FIG. 5, the plate openings 114, 148 are moved to the side of the wall openings 108, 146, with the position of wall opening 146 being projected onto plate 112 in broken line in FIG. 5. In FIGS. 6-7 the obturator plates 110, 112 have been moved by rotation of the drive element 124. It can be seen that the plate opening 148 of obturator plate 112 slightly overlaps with the wall opening 146 (shown in broken line here to illustrate its relative position with respect to the plates as shown in FIG. 4). However the plate openings 114, 148 are not overlapping, and as a result flow will not pass through the valve. Or to put it another way, the plates block the flow of substance through the valve 100 when the plates 110, 112 are in the positions when here. FIGS. 8-9, show a further movement of the plates 110, 112, and in FIG. 9 it can be seen that the plate openings begin to overlap in line with the wall openings 108, 146, partially opening the valve. FIGS. 10-11 show the plates 110, 112 in the fully open position, where the plate openings 114, 148 align fully with the wall openings 108, 146. To close the valve, the sequence would simply be reversed, with the drive element 124 rotating in the opposite direction.

Figure 12:
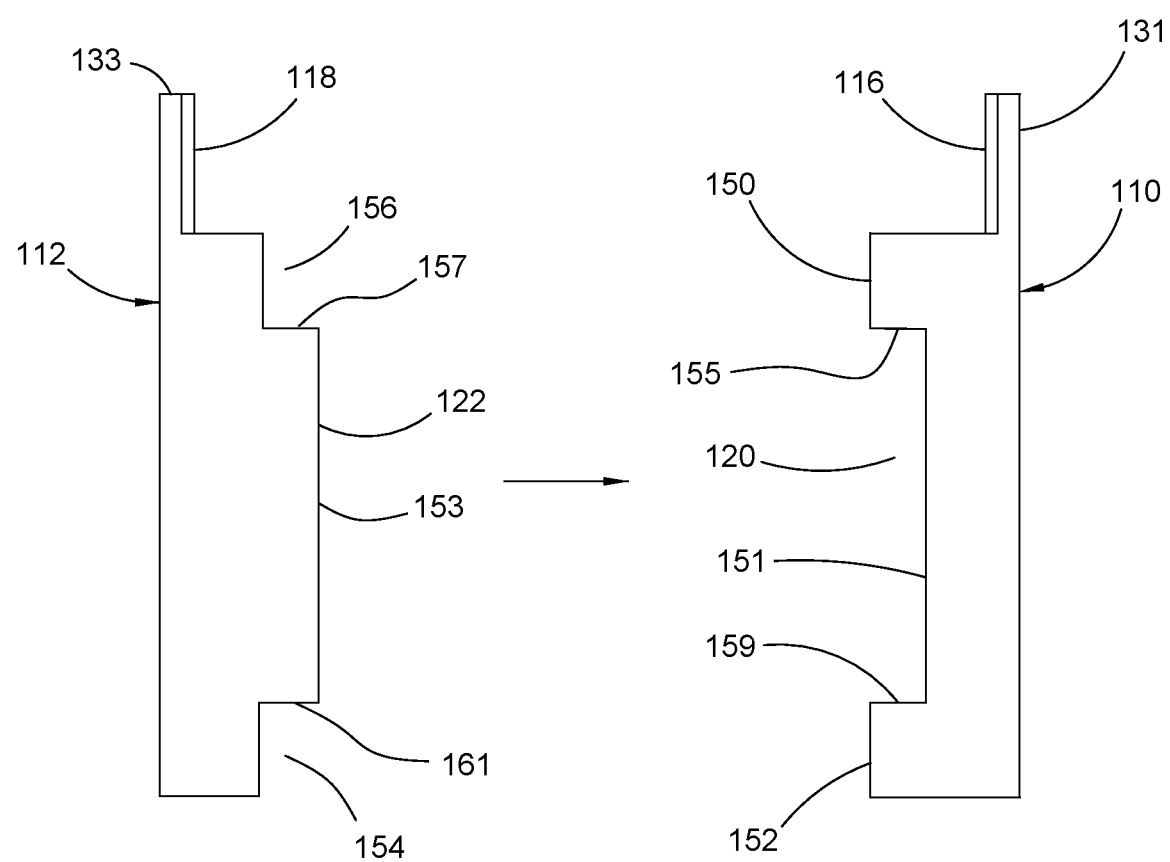
FIG. 12 is a side view of the obturator plates, separated from each other, to show anti-canting features, in accordance with some embodiments.

FIG. 12 is a side view of the obturator plates 110, 112, separated from each other, to show anti-canting features, in accordance with some embodiments. It has been found in some embodiments, depending on the specific geometry of the obturator plates and the housing, where the obturator plates interface with each other and are flat, that upon being driven to move, the torque exerted on the plates against the resistance of the plates against the housing wall results in a twist that urges the plates to tilt or cant in an opposing manner. As a result, one end of each plate urges upward, and the opposite end urges downward, which can increase resistance to moving within the housing valve housing. To counteract that effect, the plates 110, 112 can be designed with an anti-canting feature where the plates intermesh, horizontally, so that the respective torques imparted to each plate 110, 112 by the drive element cancel each other. For example, obturator plate 110 can include a groove or recess 120 that runs along the length of the plate 110, and is bounded by a top extension 150 and a bottom extension 152. The groove provides a flat vertical surface 151, and each of the extensions 150, 152 provide top and bottom surfaces 155, 159 that are orthogonal to the vertical surface 151 of the groove 120. Obturator plate 112 has corresponding "negative" features, including a horizontal extension 122 that fits into the groove 120, having an vertical surface 153 that can mate with vertical surface 151 of the groove 120. Likewise surfaces 155 and 159 mate with top and bottom surfaces 157, 161, respectively, of the horizontal extension 122. This arrangement interlocks the plates 110, 112 to prevent differential torque between the plates 110, 112 when being moved by the driving element. Further, in this view, the vertical extensions 131, 133 on which teeth 116, 118 are located can be seen at the top of each plate 110, 112 such that there is a space between the vertical extensions 131, 133 in which a driving element can fit.

Figure 13:
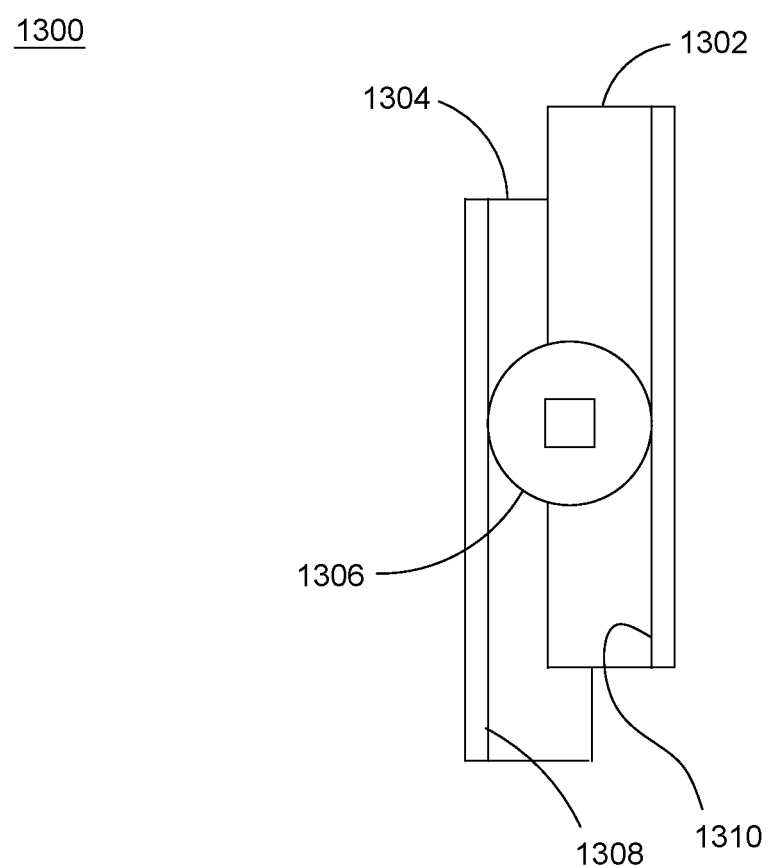
FIG. 13 show an overhead view of an obturator plate and drive arrangement, in accordance with some embodiments.

FIG. 13 shows an overhead view of an obturator plate and drive arrangement 1300, in accordance with some embodiments. Specifically, the arrangement 1300 includes a pair of obturator plates 1302, 1304 that can be placed in a housing (e.g. housing 102), and which are moved in a reciprocal manner by a drive element 1306, which engages vertical extensions 1310, 1308 of the plates 1302, 1304. Unlike the toothed/gear drive arrangement of the previously described embodiments, the arrangement 1300 uses a wheel or otherwise smooth annular drive element 1306 that can be made of, or have an outer surface layer made of a material with a high coefficient of friction on the materials of the plates 1302, 1304, such as rubber. The drive element 1306 frictionally engages the inward facing surfaces of the vertical extensions 1310, 1308, which can be smooth, or textured.

An eclipse valve has been disclosed that addresses the problems associated with prior art valves. The inventive eclipse valve eliminates the need for a "block and bleed" valve arrangement, it can be easily serviced while remaining in-line in a flow system, and it eliminates the need for complex mechanical arrangements like shutter valves. There are essentially only three moving parts; the two obturator plates and the driving element. The surface engagement between the obturator plates and the housing, and with each other, provide excellent sealing, while still allowing ease of movement.

The claims appended hereto are meant to cover all modifications and changes within the scope and spirit of the present invention.

What is claimed is:

1. An eclipse valve, comprising:
a housing having a cavity;
the cavity bounded by a floor of the housing, a front wall of the housing that extends upward from the floor at a front of the housing, a back wall opposite the front wall the extends upward from the floor at a back of the housing, a right side wall that extends upward from the floor at a right side of the housing between the front wall and the back wall, and a left side wall that extends upward from the floor at a left side of the housing between the front wall and the back wall, a length of the cavity defined from the right side wall to the left side wall inside the cavity, and a width of the cavity defined from the front wall to the back wall inside the cavity;
a front fitting formed at an outside of the front wall and including a front opening through the front wall;
a back fitting formed at an outside of the back wall and including a back opening through the back wall, wherein the front and back openings are aligned from front to back, wherein a flow axis is defined through the eclipse valve from the front fitting to the back fitting;
a first obturator plate disposed in the cavity against the front wall;
a second obturator plate disposed in the cavity against the back wall;
wherein the first and second obturator plates each have a length in a direction of the length of the cavity and that is less than the length of the cavity, and wherein the first and second obturator plates are in sliding engagement with each other and wherein a width across the first and second obturator plates is substantially equal to the width of the cavity, wherein the first and second obturator plates are configured to horizontally reciprocate within the cavity along the length of the cavity in an opposing manner while remaining in contact with the front wall, the back wall, and each other;
the first obturator plate having an opening through the first obturator plate in a direction from the front wall to the back wall, and wherein the opening through the first obturator plate is off center in a first direction between the right side wall and the left side wall, the first obturator plate further having a vertical extension on a top of the first obturator plate which extends along the length of the first obturator plate;
the second obturator plate having an opening through the second obturator plate in a direction from the front wall to the back wall, and wherein the opening through the second obturator plate is off center in a second direction between the right side wall and the left side wall that is opposite the first direction, the second obturator plate further having a vertical extension on a top of the second obturator plate which extends along the length of the second obturator plate;
a driver element is positioned horizontally between, and in contact with both the vertical extension of the first obturator plate and the vertical extension of the second obturator plate, wherein the driver element is positioned over the flow axis; and
wherein the first and second obturator plates are moveable, by rotation of the driver element, in the cavity between an open position where the opening through the first obturator plate and the opening through the second obturator plate are both aligned with each other and with the front opening and the back opening, and a closed position where the first and second obturator plates are moved to opposite sides in the cavity between the right side wall and the left side wall, and wherein in the closed position opening through the first obturator plate is completely unaligned from the front opening, the opening through the second obturator plate is completely unaligned from the back opening.

2. The eclipse valve of claim 1, wherein the driver element is a pinion gear attached to a shaft that extends through a cover over the cavity, the pinion gear being circular and having vertically oriented teeth, the vertical extension of the first obturator plate having a plurality of teeth along the vertical extension of the first obturator plate, each of the plurality of teeth being vertically oriented, the vertical extension of the second obturator plate having a plurality of teeth along the vertical extension of second obturator plate, each one of the plurality of teeth of the vertical extension of the second obturator plate being vertically oriented, wherein the plurality of teeth of the vertical extension of the first obturator plate and the plurality of teeth of the vertical wall extension of the second obturator plate intermesh with the vertically oriented teeth of the pinion gear.

3. The eclipse value of claim 2, further comprising a handle attached to the shaft at an opposite end of the shaft from the pinion gear.

4. The eclipse valve of claim 1, wherein the first obturator plate includes, along its length at an interface between the first obturator plate and the second obturator plate, a horizontal extension that extends into a corresponding horizontal relief of the second obturator plate along the length of the second obturator plate.

5. The eclipse valve of claim 1, further comprising:
a cover over the cavity that seals the cavity;
a drive shaft extending through the cover to a horizontally oriented pinion gear under the cover, wherein the pinion gear is disposed between, and in engagement with portions of both the first obturator plate and the second obturator plate to, upon being rotated by the shaft, move the first and second obturator plates in opposing directions within the cavity.

6. An eclipse valve for flow control, comprising:
a housing having a cavity therein, the housing having a front housing opening at center of a front of the housing and a back housing opening at a center of a back of the housing, the cavity having a length, a flow axis being defined from the front housing opening to the back housing opening perpendicular to a direction of the length of the cavity;
a first obturator plate and a second obturator plate disposed in the cavity and operable to each move transversely and independently in the cavity in a direction perpendicular to the flow axis, the first obturator plate being in sliding contact with the front of the housing, the second obturator plate being in sliding contact with the back of the housing, an opening formed through the first obturator plate and an opening formed through the second obturator plate the first obturator plate having a length in a direction of the length of the cavity, and the second obturator plate having a length in the direction of the length of the cavity;
the first obturator plate further having a vertical extension on a top of the first obturator plate which extends along the length of the first obturator plate;
the second obturator plate further having a vertical extension on a top of the second obturator plate which extends along the length of the second obturator plate;
a drive element positioned horizontally over the flow axis between and in contact with each of the vertical extension of the first obturator plate and the vertical extension of the second obturator plate, and operable to move the first and second obturator plates in a horizontal transverse direction within the cavity and reciprocally with respect to each other; and
wherein the first and second obturator plates are movable by the drive element between an open position and a closed position, wherein in the open position the opening through the first obturator plate and the opening through the second obturator plate are both fully aligned with the front housing opening and the back housing opening, and wherein in the closed position the first obturator plate is moved such that it does not overlap with the front housing opening and the second obturator plate is moved in the opposite direction from the first obturator plate such that the opening through the second obturator plate does not overlap the back housing opening.

7. The eclipse valve of claim 6, further comprising:
a cover disposed over the cavity of the housing which seals the cavity; and
a drive shaft that passes through the cover to the drive element.

8. The eclipse valve of claim 6, wherein:
the vertical extension of the first obturator plate and the vertical extension of the second obturator plate each have a plurality of vertically oriented teeth; and
wherein the drive element is a pinion gear that meshes with the vertically oriented teeth of vertical extension of the first obturator plate and the vertical extension of the second obturator plate.

9. The eclipse valve of claim 6, wherein the first obturator plate includes, along the length of the first obturator plate, at an interface between the first obturator plate and the second obturator plate, a horizontal extension that extends into a corresponding horizontal relief of the second obturator plate.

10. The eclipse valve of claim 6, wherein the housing includes a front fitting at the front opening, and a back fitting at the back opening.

11. The eclipse valve of claim 10, wherein each of the front fitting and back fitting are threaded.

12. The eclipse valve of claim 6, wherein the opening through the first obturator plate is entirely on one half of the first obturator plate, and the opening through the second obturator plate is entirely on one half of the second obturator plate.

13. The eclipse valve of claim 6, wherein a diameter of the opening through the first obturator plate and a diameter of the opening through the second obturator plate are substantially equal to a diameter of the front housing opening and a diameter of the back housing opening.

14. A method for operating an eclipse valve, comprising:
providing a housing having a cavity therein, the housing having a front housing opening at a center of a front of the housing and a back housing opening at a center of a back of the housing, the cavity having a length, a flow axis being defined from the front housing opening to the back housing opening perpendicular to a direction of the length of the cavity;
providing a first obturator plate and a second obturator plate in the cavity that are operable to each move transversely and independently in the cavity in a direction perpendicular to the flow axis, the first obturator plate being provided in sliding contact with the front of the housing, the second obturator plate being provided in sliding contact with the back of the housing, an opening formed through the first obturator plate and an opening formed through the second obturator plate the first obturator plate having a length in a direction perpendicular to the flow axis, and the second obturator plate having a length in a direction perpendicular to the flow axis, the first obturator plate further having a vertical extension on a top of the first obturator plate which extends along the length of the first obturator plate, the second obturator plate further having a vertical extension on a top of the second obturator plate which extends along the length of the second obturator plate;
providing a drive element positioned horizontally over the flow axis between and in contact with each of the vertical extension of the first obturator plate and the vertical extension of the second obturator plate, and operable to move the first and second obturator plates in a horizontal transverse direction within the cavity and reciprocally with respect to each other; and
turning the drive element to move the first and second obturator plates between an open position and a closed position, wherein in the open position the opening through the first obturator plate and the opening through the second obturator plate are both fully aligned with the front housing opening and the back housing opening, and wherein in the closed position the first obturator plate is moved such that it does not overlap with the front housing opening and the second obturator plate is moved in the opposite direction from the first obturator plate such that the opening through the second obturator plate does not overlap the back housing opening.

\* \* \* \* \*